United States Patent
Dmitriev (10) Patent No.: US 9,153,209 B2
(45) Date of Patent: Oct. 6, 2015

(54) METHOD AND SYSTEM FOR GENERATING A DISPLACEMENT MAP FROM A NORMAL MAP

(75) Inventor: Kirill Dmitriev, Moscow (RU)

(73) Assignee: NVIDIA Corporation, Santa Clara, CA (US)

(*) Notice: Subject to any disclaimer, the term of this patent is extended or adjusted under 35 U.S.C. 154(b) by 455 days.

(21) Appl. No.: 13/568,038

(22) Filed: Aug. 6, 2012

(65) Prior Publication Data

US 2014/0035940 A1    Feb. 6, 2014

(51) Int. Cl.
G09G 5/00      (2006.01)
G06T 17/00     (2006.01)
G09G 5/36      (2006.01)
G06T 15/04     (2011.01)

(52) U.S. Cl.
CPC .............. *G09G 5/363* (2013.01); *G06T 15/04* (2013.01); *G09G 2352/00* (2013.01); *G09G 2360/10* (2013.01)

(58) Field of Classification Search
None
See application file for complete search history.

(56) References Cited

U.S. PATENT DOCUMENTS

| | | | |
|---|---|---|---|
| 2005/0280648 A1* | 12/2005 | Wang et al. | 345/420 |
| 2012/0262457 A1* | 10/2012 | Gautron et al. | 345/426 |
| 2013/0265310 A1* | 10/2013 | Hirtzlin et al. | 345/426 |

OTHER PUBLICATIONS

Policarpo, Fábio, Manuel M. Oliveira, and João LD Comba. "Real-time relief mapping on arbitrary polygonal surfaces." Proceedings of the 2005 symposium on Interactive 3D graphics and games. ACM, 2005.*
Donnelly, William. "Per-pixel displacement mapping with distance functions." GPU gems 2.22 (2005): 3.*
Wei, Tiangong, and Reinhard Klette. A new algorithm for gradient field integration. CITR, The University of Auckland, New Zealand, 2001.*
Dmitriev, Kirill, and Evgeny Makarov. "Generating displacement from normal map for use in 3D games." ACM Siggraph 2011 Talks. ACM, Aug. 7-11, 2011.*

* cited by examiner

*Primary Examiner* — Ryan R Yang
*Assistant Examiner* — Sultana M Zalalee
(74) *Attorney, Agent, or Firm* — Artegis Law Group, LLP (57) ABSTRACT

One embodiment of the present invention sets forth a technique for generating a displacement map. The technique involves receiving a normal map which includes one or more normal vectors associated with a texture map, processing the one or more normal vectors to a calculate one or more depth difference vectors associated with the texture map, and generating one or more rays associated with a first texel of the texture map. The technique further involves calculating, for each of the one or more rays, relative depths of each of the one or more other texels traversed by the ray based on each of the depth difference vectors that correspond with the one or more other texels traversed by the ray, determining a displacement value associated with the first texel based on the relative depths calculated for the one or more rays, and storing the displacement value in a displacement map.

20 Claims, 6 Drawing Sheets

METHOD AND SYSTEM FOR GENERATING A DISPLACEMENT MAP FROM A NORMAL MAP

BACKGROUND OF THE INVENTION

1. Field of the Invention

The present invention generally relates to computer graphics, and, more specifically, to a method and system for generating a displacement map from a normal map.

2. Description of the Related Art

Conventionally, graphics processing systems have relied on techniques such as bump mapping to produce realistic lighting effects in computer-generated images. In bump mapping, the surface normals of a polygon mesh are calculated and stored in a normal map. During rendering, the normal map is used to perform lighting calculations, which are applied to a lower-resolution version of the polygon mesh. In this way, geometric details present on the original polygon mesh can be simulated and applied to a lower-resolution polygon mesh in order to conserve computational resources. Although bump mapping is capable of simulating the lighting of the original object, the underlying geometry of the lower-resolution object is unchanged. Consequently, bump mapping cannot accurately produce silhouettes, occlusion, and shadows, revealing the coarseness of the object's underlying geometry.

As the processing power of graphics systems increases, it has become possible to render images having higher and higher polygon counts. Accordingly, current graphics application programming interfaces (APIs) (e.g., DirectX 11) have begun to implement functions that enable more sophisticated control over geometry shaders, such as the ability to perform tessellation of incoming graphics primitives. Through tessellation, developers have the ability to increase the geometric detail of an object by generating additional graphics primitives and displacing the vertices of those primitives to more realistically reproduce the geometric details of the object. However, as discussed above, many existing graphic assets were designed to be used with techniques (e.g., bump mapping) that do not affect object geometries and were not designed or intended to be used with tessellation. Consequently, existing graphic assets typically lack the geometric information (e.g., depth information) needed to generate realistic and detailed object geometries with the additional vertices created during tessellation. Moreover, the process of converting existing graphic assets to take advantage of tessellation, as well as other sophisticated geometric processing techniques included in current graphics APIs, is time-consuming and expensive. Thus, given the financial risks and uncertain return on investment, few developers are willing to expend the resources necessary to update existing graphic assets to include the required geometric information.

Accordingly, what is needed in the art is an approach that allows existing graphic assets to be used in conjunction with the functions of more advanced graphics APIs that enable more sophisticated control over object geometries.

SUMMARY OF THE INVENTION

One embodiment of the present invention sets forth a method for generating a displacement map. The method involves receiving a normal map which includes one or more normal vectors associated with a texture map, processing the one or more normal vectors to a calculate one or more depth difference vectors associated with the texture map, and generating one or more rays associated with a first texel of the texture map, where each of the one or more rays associated with the first texel traverses one or more other texels of the texture map. The method further involves calculating, for each of the one or more rays associated with the first texel, relative depths of each of the one or more other texels traversed by the ray based on each of the depth difference vectors that correspond with the one or more other texels traversed by the ray, determining a displacement value associated with the first texel based on the relative depths calculated for the one or more rays, and storing the displacement value in a displacement map.

Further embodiments provide a non-transitory computer-readable medium and a computing device to carry out the method set forth above.

One advantage of the disclosed technique is that the normal maps of existing graphic assets can be quickly and inexpensively converted into displacement maps, enabling existing graphic assets to be used in systems capable of performing tessellation of incoming geometries and displacing the vertices of the resulting graphic primitives to generate more detailed geometric features.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
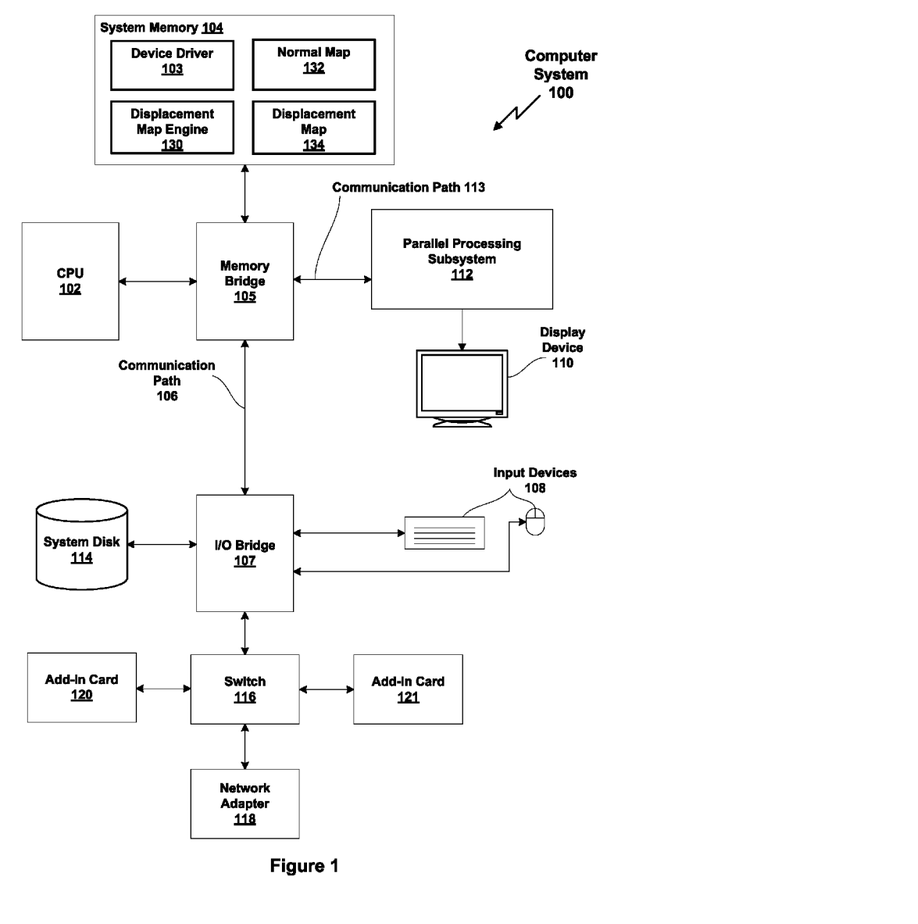
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. The system memory 104 may be configured to store a device driver 103, a displacement map engine 130, a normal map 132, and a displacement map 134. The CPU 102 may be configured to execute the displacement map engine 130 to process a normal map 132 and generate a displacement map 134. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system-on-chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
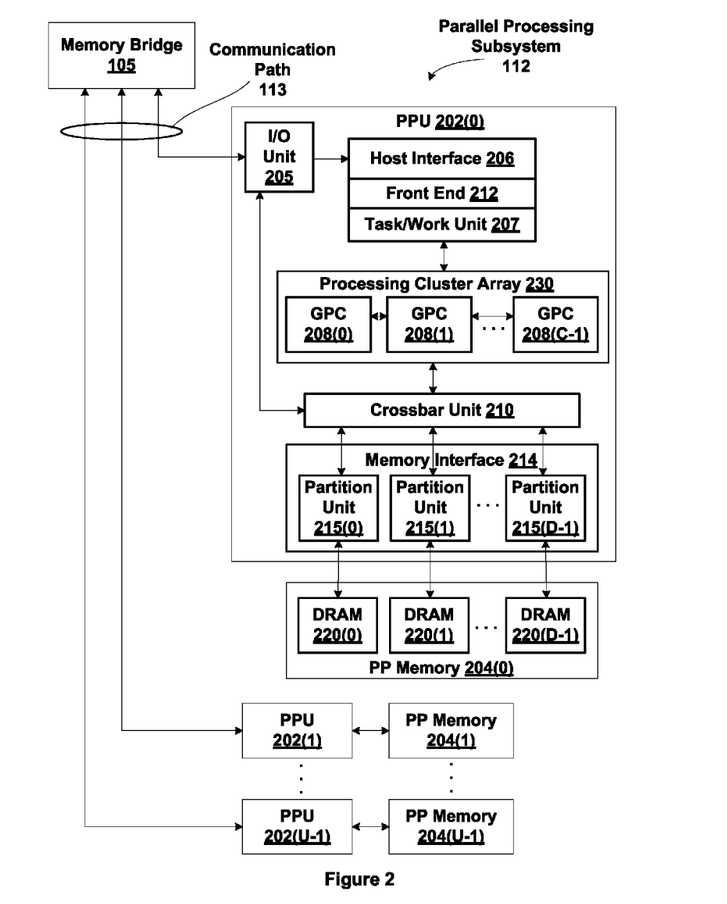
FIG. 2 illustrates a parallel processing subsystem, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory 104 exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, smart phones, servers, workstations, game consoles, embedded systems, and the like.

Generating a Displacement Map from a Normal Map

FIGS. 3A-3D illustrate the operation of a displacement map engine 130, according to one embodiment of the present invention. As shown, the displacement map engine 130 accepts a normal map 132 as an input and generates a displacement map 134 as an output. The displacement map 134 includes a plurality of displacement values, each displacement value indicating the distance that a vertex associated with a given texel location should be displaced. The normal map 132 includes a plurality of normal values, each normal value indicating a surface orientation associated with a texel location. The normal map 132 is associated with a corresponding texture map (not shown) that includes color information for an image (i.e., a texture) to be applied to the surface of a primitive when rendering the primitive to generate an image for display.

Figure 3A:
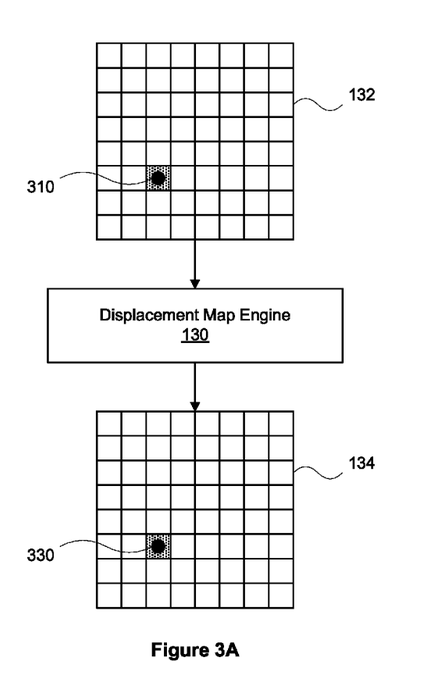
FIGS. 3A-3D illustrate the operation of a displacement map engine, according to one embodiment of the present invention.
Figure 3B:
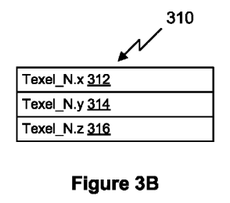
Figure 3C:
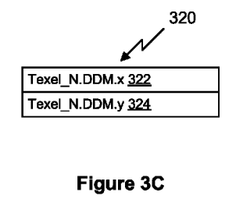
Figure 3D:
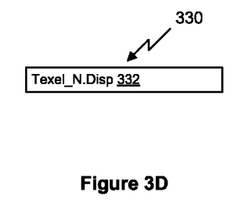

For example, as shown in FIG. 3B, sample point 310 on the normal map 132 corresponds to a texel of a texture map and contains a vector, specified as Texel_N.x 312, Texel_N.y 314, and Texel_N.z 316, indicating the orientation of a theoretical surface of the texel. The vector represents the normal vector of the theoretical surface corresponding to the texel. In conventional rendering operations, PPU 202 receives one or more primitives (e.g., a triangle, quad, etc.), which are processed to generate pixel data for display on display device 110. The vertices of the primitive include vertex attributes such as position information, color information, texture coordinate information and the like. Texture coordinates enable PPU 202 to map additional color information stored in the texture map onto the surface of the primitive rather than calculating the color for each pixel of the primitive by interpolating between color attributes stored in the vertices of the primitive. In some rendering algorithms (e.g., bump-mapping), the normal vectors associated with each texel in a texture map are used to perform lighting calculations across a primitive to vary the brightness of each pixel associated with the primitive based on the orientation of the surface with a light source. Although the exemplary normal and displacement maps 132, 134 shown in FIG. 3A include sample points 310, 330 on a per texel basis, persons skilled in the art will understand that these maps can be configured to include samples having different levels of granularity (e.g., texel, sub-texel, etc.). In other words, normal and displacement maps 132, 134 may have more than one, or less than one, sample point for each corresponding texel of the texture map.

Vector information (e.g., 312, 314, 316) may be stored in the normal map 132 in any format useful for performing lighting computations. In one embodiment, each of the N sample points of normal map 132 includes X, Y, and Z components specified in a format such as [−1, 0, 1]. In another embodiment, the same vector may be specified using 8-bit values, such as [0, 128, 255]. In the latter embodiment, each normal vector may be conveniently stored as an RGB color value in a texture map.

During processing of the normal map 132, the CPU 102 may execute the displacement map engine 130 to compute, for each texel of the corresponding texture map, the change in depth when traversing the texel in a particular direction. More specifically, because the texel size is known, and because the normal map includes a vector indicating the orientation of a theoretical surface of each texel, basic trigonometric functions and vector multiplication can be used to determine the change in depth when traversing the texel in the x direction 322 and the change in depth when traversing the texel in the y direction 324. These intermediate values, shown in FIG. 3C, may optionally be stored to a depth difference map (DDM) 136 in system memory 104, or the intermediate values may be computed on the fly. In one embodiment, a sample point 320 on the DDM 136 corresponds to a texel of a texture map, as well as a sample point 310 on the normal map 132, and contains a two-component vector, specified as Texel_N.DDM_x 322 and Texel_N.DDM_y 324, indicating the rate of change of height across the texel in an x dimension and the rate of change of height across a texel in a y dimension. The DDM may be, for example, a texture map which stores floating-point values (e.g., Float2).

Finally, the displacement map engine 130 may generate a displacement map 134 by integrating across one or more rays based on the depth difference vectors (e.g., 322, 324) stored in the DDM 136 to find a displacement associated with a texel of the texture map. In one embodiment, discussed in further detail in conjunction with FIGS. 4 and 5A-5C, the DDM 136 may be integrated over multiple rays originating from the same texel, in a plurality of directions, and the integration results may be averaged to compute a relative displacement of the sample point 330. The computed displacement value 332 corresponding to a particular sample point 330 may be stored in the displacement map 134 in system memory 104. Thus, the displacement map engine 130 is capable of receiving a normal map 132 and generating a displacement map 134, allowing displacement information to be efficiently generated for existing graphic assets. The displacement map engine 130 may be used offline to prepare displacement maps 134 for existing graphic assets, or the displacement map engine 130 may be used to generate displacement maps in real-time during the execution of graphics software.

Figure 4:
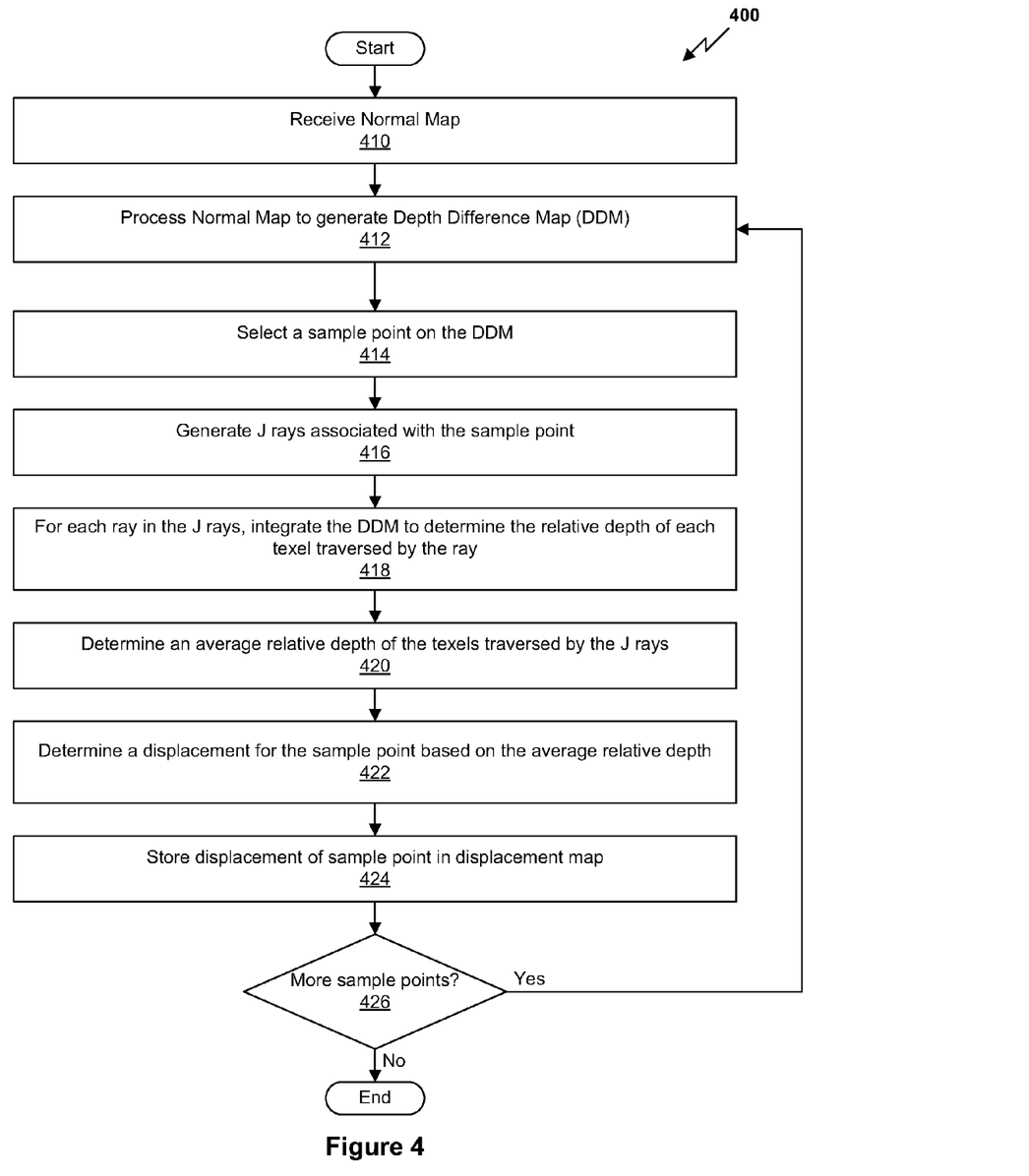
FIG. 4 is a flow diagram of methods steps for generating a displacement map from a normal map, according to one embodiment of the present invention.

FIG. 4 is a flow diagram of methods steps for generating a displacement map from a normal map, according to one embodiment of the present invention. Although the method steps are described in conjunction with FIGS. 1-3 and 5A-5C, persons skilled in the art will understand that any system configured to perform the method steps, in any order, falls within the scope of the present invention.

The method begins at step 410, where the CPU 102 executes the displacement map engine 130 that receives a normal map 132 from the system memory 104. The normal map 132 includes a plurality of normal vectors associated with a plurality of texels of a corresponding texture map, with each normal vector indicating a surface orientation associated with a particular texel of the texture map. At step 412, the displacement map engine 130 processes the normal map 132 to generate a depth difference map (DDM) 136 associate with the texture map. As discussed above, the DDM 136 may be generated with basic trigonometric functions based on the size of the texel and orientation of the theoretical surface of the texel. The values stored in the DDM 136 may include an X channel, indicating the rate of change of height when traversing a texel in an x dimension, and a Y channel, indicating the rate of change of height when traversing a texel in an y dimension.

Figure 5A:
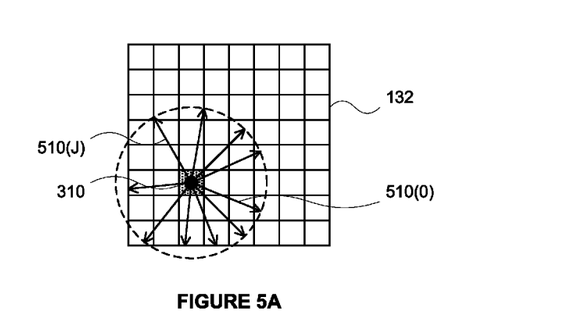
FIGS. 5A-5C illustrate a technique for generating a displacement map from a normal map, according to one embodiment of the present invention.
Figure 5B:
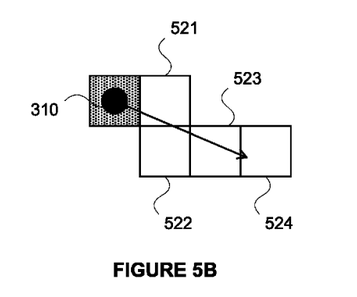

Next, at step 414, once the DDM 136 has been generated, a sample point 330 in the displacement map 134 is selected, as shown in FIGS. 5A and 5B. In the current embodiment, each sample point 330 of displacement map 134 corresponds to a texel location 520 in the corresponding texture map 500. However, persons skilled in the art will understand that the displacement map 134 can be configured to include samples having any level of granularity (e.g., texel, sub-texel, etc.). At step 416, a plurality of J rays 510 associated with the texel are generated. The J rays 510 may share a common starting point within the texel, such as a center, edge, interior, or exterior of a texel, that corresponds with the sample point 330 of the displacement map 134. Alternatively, the J rays 510 may have one or more different starting points within the texel. Because the normal vectors from which the DDM 136 is computed are inexact values—often stored in low precision—which do not contain information regarding discontinuities in surface orientation between adjacent texels, the displacement value computed for a particular sample point based on these normal vectors may be inaccurate. Consequently, to compensate for these inaccuracies, displacement values 332 may be computed independently for each texel by uniformly distributing the J rays 510 over 360 degrees and computing an average displacement across multiple texels in multiple directions. For texel locations at or near the edge of the texture map, the J rays 510 may distributed using a partial circle (i.e., less than 360 degrees).

Any number of rays extending across any number of texels may be generated. In general, 500 rays having a radius of approximately 250 texels is sufficient for any given texture. However, to conserve computational resources, approximately 5-50 rays extending across 10-100 texels may be generated for each texel in a texture map. The embodiment shown FIG. 5A, provided for illustrative purposes, includes ten rays 510, each of which share a common starting point at the center of a texel 520 of a texture map 500 which corresponds with normal map 132, DDM 136, and displacement map 134. Additionally, the rays 510 are relatively evenly distributed over 360 degrees, and each ray 510 traverses approximately three to five texels.

Figure 5C:
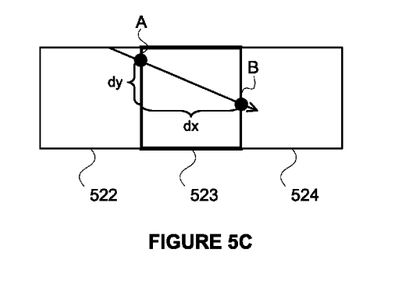

At step 418, for each ray in the J rays, the displacement map engine 130 integrates over the ray to determine the depth associated with each of the texels traversed by the ray 510 relative to the depth associated with the starting point of the ray 510. Integration may be performed in any useful coordinate system (Cartesian coordinates, polar coordinates, etc.). As shown in FIG. 5B, a ray 510 may cross near the middle of a texel, or a ray 510 may cross near the edge of a texel. Consequently, the degree to which each texel contributes to the computed depth may vary. The contribution of each texel may be computed from Equation 1, as illustrated in FIG. 5C, where height(A) is the height relative to the starting point of the ray 510 when entering the texel, DDM(x) is the rate of change of height when traversing a texel in an x dimension, DDM(y) is the change in depth when crossing the texel in the vertical direction, dx is the magnitude of the interval over which the ray 510 traverses the texel in the X direction, and dy is the magnitude of the interval over which the ray 510 traverses the texel in the Y direction. For example, a value of −1.5 for DDM(x) indicates that, when traversing the texel in the horizontal direction, the height decreases by 1.5 units across the width of the texel, while a value of 0.5 for DDM(y) indicates that, when traversing the texel in the vertical direction, the height increases by 0.5 units across the height of the texel. In the example provided in FIG. 5C, dx has a value of 1.0, and dy has a value of approximately 0.4. Moreover, as an additional example, were the ray 510 to traverse a texel in a purely vertical direction, dx would have a value of 0, and dy would have a value of 1.0.

$$\text{depth}(B)=\text{depth}(A)+\text{DDM}(x,y)*(dx,dy) \quad \text{(Eq. 1)}$$

At step 420, the relative depths associated with each of the texels traversed by the J rays are averaged. Additionally, weighting values may be assigned to particular texels traversed by the rays 510. In one example, a texel which is traversed by multiple rays 510 (e.g., a texel near the starting point) may be weighted such that it does not disproportionately contribute to the average relative depth of the texels traversed by the rays. At step 422, a displacement value for the starting texel is determined based on the average depth associated with the texels traversed by the J rays. In order to maintain substantially the same average height of an object (onto which the displacement values are to be mapped), the displacement values recorded for the texel may be computed by offsetting the sample point 330 by the computed average depth. For instance, if an average depth of +3.0 units is calculated for the texels traversed by the J rays, a displacement value of −3.0 units may be recorded for the sample point 330.

This zero average depth approach enables object vertices to be displaced without significantly increasing the size the object itself. In other embodiments, the displacement value may be determined by further comparing the average depth to the average depth(s) calculated for nearby texel(s), and/or by applying one or more weighting or smoothing algorithms to the displacement values.

Finally, in step 424, the displacement value for the sample point 330 is stored in a displacement map 134 in the system memory 104. In step 426, the displacement map engine 130 determines whether to calculate displacement values for additional sample points. If there are additional sample points to calculate, then method 400 returns to step 412. However, if there are no additional sample points to calculate, then method 400 terminates.

Graphics Pipeline Architecture

Figure 6:
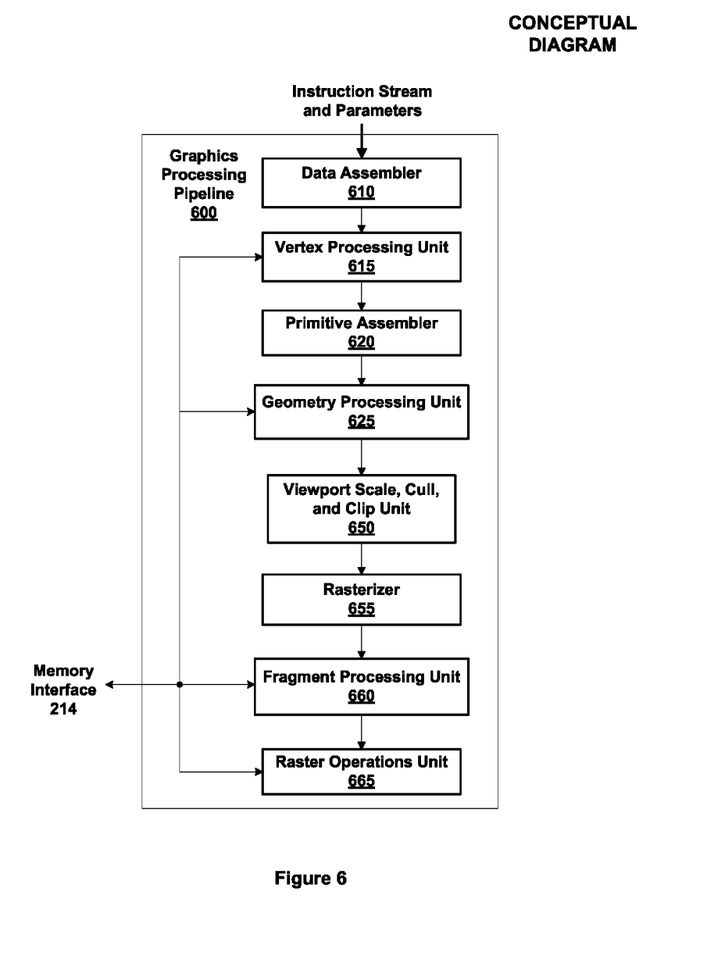
FIG. 6 is a conceptual diagram of a graphics processing pipeline, that one or more of the PPUs of FIG. 2 can be configured to implement, according to one embodiment of the present invention.

FIG. 6 is a conceptual diagram of a graphics processing pipeline 600, that one or more of the PPUs 202 of FIG. 2 can be configured to implement, according to one embodiment of the present invention. For example, one of the GPCs 208 may be configured to perform the functions of one or more of a vertex processing unit 615, a geometry processing unit 625, and a fragment processing unit 660. The functions of data assembler 610, primitive assembler 620, rasterizer 655, and raster operations unit 665 may also be performed by other processing engines within a GPC 208 and a corresponding partition unit 215. Alternately, graphics processing pipeline 600 may be implemented using dedicated processing units for one or more functions.

Data assembler 610 collects vertex data for high-order surfaces, primitives, and the like, and outputs the vertex data, including the vertex attributes, to vertex processing unit 615. Vertex processing unit 615 is a programmable execution unit that is configured to execute vertex shader programs, lighting and transforming vertex data as specified by the vertex shader programs. For example, vertex processing unit 615 may be programmed to transform the vertex data from an object-based coordinate representation (object space) to an alternatively based coordinate system such as world space or normalized device coordinates (NDC) space. Vertex processing unit 615 may read data that is stored in a GPC 208 cache, parallel processing memory 204, or system memory 104 by data assembler 610 for use in processing the vertex data.

Primitive assembler 620 receives vertex attributes from vertex processing unit 615, reading stored vertex attributes, as needed, and constructs graphics primitives for processing by geometry processing unit 625. Graphics primitives include triangles, line segments, points, and the like. Geometry processing unit 625 is a programmable execution unit that is configured to execute geometry shader programs, transforming graphics primitives received from primitive assembler 620 as specified by the geometry shader programs. For example, geometry processing unit 625 may be programmed to perform tessellation of incoming graphics primitives to subdivide the graphics primitives into one or more new graphics primitives. A displacement map (e.g., displacement map 134) may then be applied to the vertices of the new graphics primitives generated during tessellation to displace the vertices and increase the geometrical detail and realism of objects within the scene. Additionally, the geometry processing unit 625 may be programmed to calculate parameters, such as plane equation coefficients, that are used to rasterize the new graphics primitives.

In some embodiments, geometry processing unit 625 may also add or delete elements in the geometry stream. Geometry processing unit 625 outputs the parameters and vertices specifying new graphics primitives to a viewport scale, cull, and clip unit 650. Geometry processing unit 625 may read data that is stored in parallel processing memory 204 or system memory 104 for use in processing the geometry data. Viewport scale, cull, and clip unit 650 performs clipping, culling, and viewport scaling and outputs processed graphics primitives to a rasterizer 655.

Rasterizer 655 scan converts the new graphics primitives and outputs fragments and coverage data to fragment processing unit 660. Additionally, rasterizer 655 may be configured to perform z culling and other z-based optimizations.

Fragment processing unit 660 is a programmable execution unit that is configured to execute fragment shader programs, transforming fragments received from rasterizer 655, as specified by the fragment shader programs. For example, fragment processing unit 660 may be programmed to perform operations such as perspective correction, texture mapping, shading, blending, and the like, to produce shaded fragments that are output to raster operations unit 665. Fragment processing unit 660 may read data that is stored in parallel processing memory 204 or system memory 104 for use in processing the fragment data. Fragments may be shaded at pixel, sample, or other granularity, depending on the programmed sampling rate.

Raster operations unit 665 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 665 is configured to compress z or color data that is written to memory and decompress z or color data that is read from memory.

In sum, a displacement map engine converts a normal map into a depth difference map (DDM), which includes an X channel indicating the change in depth when traversing a texel in a horizontal direction and a Y channel indicating the change in depth when traversing the texel in a vertical direction. The displacement map engine then generates a displacement map from the DDM by integrating across the DDM from each sample position in both angular and radial directions over a selected radius length and a selected range of angles. The resulting displacement values are then used to perform displacement mapping on one or more tessellated surfaces of an object to create more realistic and detailed object geometries.

One advantage of the disclosed technique is that the normal maps of existing graphic assets can be quickly and inexpensively converted into displacement maps, enabling existing assets to be used in systems capable of performing tessellation of incoming geometries and displacing the vertices of the resulting graphic primitives to generate more detailed geometric features.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed:

1. A method for generating a displacement map, the method comprising:
   receiving a normal map comprising one or more normal vectors associated with a texture map;
   processing the one or more normal vectors to a calculate one or more depth difference vectors associated with the texture map;
   generating, via a processing unit, one or more rays associated with a first texel of the texture map, wherein each of the one or more rays associated with the first texel traverses one or more other texels of the texture map;
   for each of the one or more rays associated with the first texel, calculating relative depths of each of the one or more other texels traversed by the ray based on each of the depth difference vectors that correspond with the one or more other texels traversed by the ray;
   determining a displacement value associated with the first texel based on the relative depths calculated for the one or more rays; and
   storing the displacement value in a displacement map.

2. The method of claim 1, further comprising:
   generating one or more rays associated with a second texel of the texture map, wherein each of the one or more rays associated with the second texel traverses one or more other texels of the texture map;
   for each of the one or more rays associated with the second texel, calculating relative depths of each of the one or more other texels traversed by the ray based on each of the depth difference vectors that correspond with the one or more other texels traversed by the ray;
   determining a second displacement value associated with the second texel based on the relative depths calculated for the one or more rays associated with the second texel; and
   storing the second displacement value in a displacement map.

3. The method of claim 1, wherein the relative depth is the difference between a height of each of the one or more other texels traversed by the ray and a height of a starting point of the ray.

4. The method of claim 1, wherein determining the displacement value comprises calculating an average relative depth of each of the one or more other texels traversed by the one or more rays.

5. The method of claim 4, wherein determining the displacement value further comprises offsetting the displacement value by the average relative depth.

6. The method of claim 1, wherein endpoints of the one or more rays surround the texel in a substantially uniform manner.

7. The method of claim 1, wherein calculating the relative depths of each of the one or more other texels traversed by the ray comprises integrating over the length of the ray based on the one or more depth difference vectors corresponding to the one or more texels traversed by the ray.

8. The method of claim 7, wherein the integrating is performed in a polar coordinate system.

9. The method of claim 1, wherein the depth difference vectors are stored in a depth difference map.

10. A non-transitory computer-readable storage medium including instructions that, when executed by a processing unit, cause the processing unit to generate a displacement map, by performing the steps of:
   receiving a normal map comprising one or more normal vectors associated with a texture map;
   processing the one or more normal vectors to a calculate one or more depth difference vectors associated with the texture map;
   generating one or more rays associated with a first texel of the texture map, wherein each of the one or more rays associated with the first texel traverses one or more other texels of the texture map;
   for each of the one or more rays associated with the first texel, calculating relative depths of each of the one or more other texels traversed by the ray based on each of the depth difference vectors that correspond with the one or more other texels traversed by the ray;
   determining a displacement value associated with the first texel based on the relative depths calculated for the one or more rays; and
   storing the displacement value in a displacement map.

11. The non-transitory computer-readable storage medium of claim 10, further comprising:
   generating one or more rays associated with a second texel of the texture map, wherein each of the one or more rays associated with the second texel traverses one or more other texels of the texture map;
   for each of the one or more rays associated with the second texel, calculating relative depths of each of the one or more other texels traversed by the ray based on each of the depth difference vectors that correspond with the one or more other texels traversed by the ray;
   determining a second displacement value associated with the second texel based on the relative depths calculated for the one or more rays associated with the second texel; and
   storing the second displacement value in a displacement map.

12. The non-transitory computer-readable storage medium of claim 10, wherein the relative depth is the difference between a height of each of the one or more other texels traversed by the ray and a height of a starting point of the ray.

13. The non-transitory computer-readable storage medium of claim 10, wherein determining the displacement value comprises calculating an average relative depth of each of the one or more other texels traversed by the one or more rays.

14. The non-transitory computer-readable storage medium of claim 13, wherein determining the displacement value further comprises offsetting the displacement value by the average relative depth.

15. The non-transitory computer-readable storage medium of claim 10, wherein endpoints of the one or more rays surround the texel in a substantially uniform manner.

16. The non-transitory computer-readable storage medium of claim 10, wherein calculating the relative depths of each of the one or more other texels traversed by the ray comprises integrating over the length of the ray based on the one or more depth difference vectors corresponding to the one or more texels traversed by the ray.

17. The non-transitory computer-readable storage medium of claim 16, wherein the integrating is performed in a polar coordinate system.

18. The non-transitory computer-readable storage medium of claim 10, wherein the depth difference vectors are stored in a depth difference map.

19. A computing device, comprising:
   a memory; and
   a central processing unit coupled to the memory, configured to:
      receive a normal map comprising one or more normal vectors associated with a texture map;
      process the one or more normal vectors to a calculate one or more depth difference vectors associated with the texture map;
      generate one or more rays associated with a first texel of the texture map, wherein each of the one or more rays associated with the first texel traverses one or more other texels of the texture map;
      for each of the one or more rays associated with the first texel, calculate relative depths of each of the one or more other texels traversed by the ray based on each of the depth difference vectors that correspond with the one or more other texels traversed by the ray;
      determine a displacement value associated with the first texel based on the relative depths calculated for the one or more rays; and
      store the displacement value in a displacement map.

20. The computing device of claim 19, wherein the central processing unit is configured to calculate the relative depths of each of the one or more other texels traversed by the ray comprises integrating over the length of the ray based on the one or more depth difference vectors corresponding to the one or more texels traversed by the ray.

* * * * *